G. W. WILLIAMS.
Animal-Trap.

No. 214,975. Patented April 29, 1879.

WITNESSES:
Achilles Schehl.
C. Sedgwick

INVENTOR:
G. W. Williams
BY Munn & Co
ATTORNEYS.

UNITED STATES PATENT OFFICE.

GEORGE W. WILLIAMS, OF SAN DIEGO, CALIFORNIA.

IMPROVEMENT IN ANIMAL-TRAPS.

Specification forming part of Letters Patent No. 214,975, dated April 29, 1879; application filed January 11, 1879.

*To all whom it may concern:*

Be it known that I, GEORGE WARREN WILLIAMS, of San Diego, in the county of San Diego and State of California, have invented a new and Improved Animal-Trap, of which the following is a specification.

Figure 1:
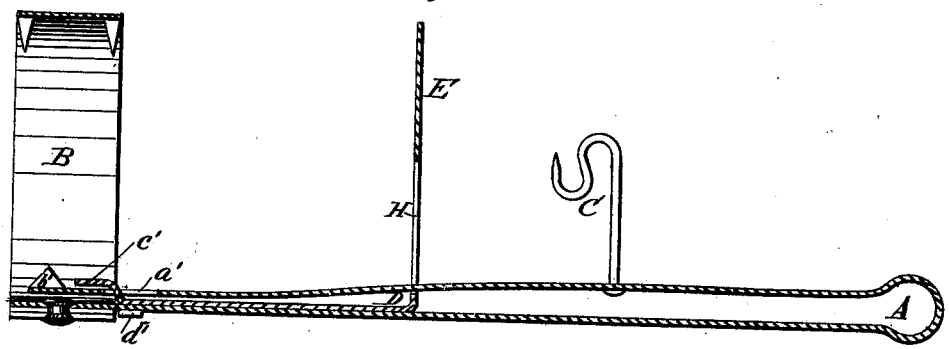
Figure 2:
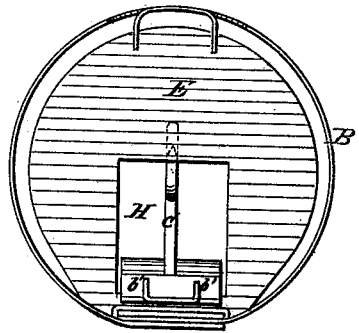
Figure 3:
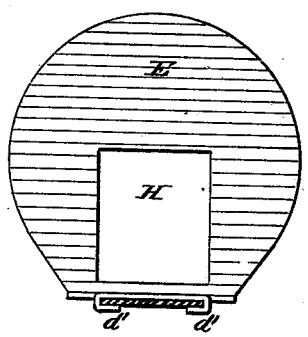

Figure 1 is a sectional longitudinal elevation of the trap. Fig. 2 is an end elevation. Fig. 3 is a front elevation of the sliding plate.

Similar letters of reference indicate corresponding parts.

The object of this invention is to furnish a simple and efficient trap for catching animals; and it consists of a toothed ring secured to one end of a bent spring, the other end of the said spring being provided with teeth, and adapted to be held down in the said ring by a slide, the rear end of which is formed into nearly a circular plate, having an opening through it, so that the bait-hook, which is attached to the spring in the rear of the slide, can be seen through the said opening.

A is a bent spring, to one end of which the notched and toothed ring B is riveted or otherwise secured, while in the other end there is a slot, $a'$, and two pointed teeth, $b'$ $b'$. C is the bait-holder, fixed upright on the upper side of the spring A. A piece of iron or steel, D, is bent at right angles, and one end is prolonged into a curved finger, $C'$, while the other end is fashioned into the nearly circular plate E, through which the opening H is made. Two clasps or lugs, $d'$ $d'$, are fixed upon the finger end of this piece of iron or steel D, and serve to guide and hold it on the under part of spring A.

To set the trap, the slotted end of the spring A is put through the opening H and bent down, as shown in Fig. 1. D is then thrust forward, so that the finger $C'$ shall engage in the slot $a'$ and hold the spring set in proper position.

This trap is especially designed to be inserted into the burrows of animals or into holes into which they have retired; and hence, when it is set as above described, and properly baited, the toothed-ring end is thrust into the burrow or hole up to the plate E and secured there. It will then happen that the animal within the burrow will, on looking out, be able to see only through the opening H, the plate being made to fit closely against the mouth of the burrow, and as the bait hanging just beyond will be the most prominent and attractive object presented to his view, he will endeavor to reach it through H; but as the opening H will be somewhat smaller than the animal's body, in his efforts to get at the bait, which is to be suspended just beyond his reach, he will move or push the plate forward with him, causing, finally, the finger $C'$ to become detached from the slot $a'$. The inevitable result of this unexpected detaching will be that the upper part of the bent spring will instantly fly up, carrying with it the unfortunate animal, and impaling him upon the sharp teeth of both ring and spring. Firmly griped by the teeth, and with his struggles restricted by the encircling plate E, the animal can be relieved only by death or the trapper.

Having thus described my invention, I claim as new and desire to secure by Letters Patent—

1. The slide D, with finger $C'$, upright plate E, and hole or opening H, to be moved by the animal to spring the trap, substantially as herein shown and described.

2. The combination of the bent spring A, the toothed ring B, the bait-holder C, and the slide D, substantially as and for the purpose described.

GEORGE WARREN WILLIAMS.

Witnesses:
WM. L. WILLIAMS,
AMOS SHELLENBERGER.